2,879,215

PRODUCTION OF CYCLOALIPHATIC KETOXIMES AND THEIR HYDROCHLORIDES

Walter Reppe, Hans-Joachim Riedl, and Otto von Schickh, Ludwigshafen (Rhine), Germany, assignors to Badische Anilin- & Soda-Fabrik Aktiengesellschaft, Ludwigshafen (Rhine), Germany No Drawing. Application August 6, 1956
Serial No. 602,445

8 Claims. (Cl. 204—158)

This invention relates to an improved process for the production of cycloaliphatic ketoximes and their hydrochlorides.

It is known that from the reaction products of nitrosyl chloride with cycloaliphatic hydrocarbons in light, the corresponding ketoximes can be recovered. The yields, however, are very unsatisfactory; it is only by maintaining very low reaction temperatures lying below —25° C. that it is possible to increase somewhat the yield of ketoximes; at higher temperatures increasing amounts of chloro compounds and other undesired products being formed.

We have now found that better yields of ketoximes are obtained by carrying out the reaction of nitrosyl chloride with cycloaliphatic hydrocarbons in light with the addition of hydrogen chloride or/and nitric oxide.

The process may be carried out in different ways. For example nitrosyl chloride and hydrogen chloride may first be dissolved in the hydrocarbon, if necessary under pressure, and the resulting solution irradiated; it begins to cloud a short time after the commencement of the action of light and soon after that the oxime hydrochloride separates in oily or crystalline form. It is also possible, however, after saturating the hydrocarbon with hydrogen chloride, to supply the nitrosyl chloride during irradiation, or even to lead in both the hydrogen chloride and nitrosyl chloride during irradiation. This method of working is especially recommended when the oxime hydrochloride is continuously separated at the rate at which it is formed and the hydrocarbon is led in circulation. It is not necessary, however, that all the nitrosyl chloride present should have been reacted prior to the filtration.

The amount of hydrogen chloride added may vary within wide limits. With the relatively small solubility of gaseous hydrogen chloride in cycloaliphatic hydrocarbons it is simplest to work near the saturation limit, but much smaller amounts, as for example 1 gram per litre, have the effect of promoting the reaction.

The yield of oxime hydrochlorides can also be increased by carrying out the reaction of nitrosyl chloride with the hydrocarbons in light with an addition of nitric oxide, the nitric oxide, which is known to have a bad solubility in hydrocarbons, being preferably pumped through the reaction solution. In this case also, hydrogen chloride may be added.

The reaction of nitrosyl chloride with the cycloaliphatic hydrocarbons in light gives satisfactory yields in the presence of hydrogen chloride or/and nitric oxide at room temperature and even at temperatures up to about 40° C. By lowering the reaction temperature, the yields may be further increased so that it may be advantageous to carry out the process at such low temperatures as can be reached technically without too great expenditure, for example at —15° C. The addition of hydrogen chloride and/or nitric oxide also has a favorable effect, however, at yet lower temperatures, as for example between about —30° and —50° C. At low temperatures it is necessary in general, by reason of the position of the freezing point of the hydrocarbons, to add diluents which are inert to the reactants, as for example carbon tetrachloride, chloroform or benzene. The addition of diluents may also be advantageous, however, at room temperature in order to facilitate the separation and removal of the oxime hydrochlorides.

The free oxime may be recovered in known manner from the separated oxime hydrochlorides. For this purpose the oxime hydrochloride is dissolved for example in a little water and neutralized with substances having an alkaline reaction, such as caustic soda or potash solutions, alkali carbonates or ammonia. The free oximes in general separate immediately in crystallized form when working carefully.

Suitable cycloaliphatic hydrocarbons for the process are for example cyclopentane, cyclohexane, cycloheptane, cyclooctane and their alkyl derivatives.

As active light there may be used the emissions of mercury vapor or other metal vapor lamps, electric arcs, fluorescent tubes, incandescent bulbs and also sunlight.

The following examples will further illustrate this invention but the invention is not restricted to these examples.

Example 1

In a cylindrical stirring vessel 21 centimetres long and of 9.5 centimetres internal width, which is provided at the bottom with a drain cock, there is arranged a cooling vessel of quartz or glass which is open at the top and provided with an inlet and outlet, and in this is introduced a mercury immersion lamp. 1 litre of cyclohexane is charged into the reaction chamber, it is saturated at room temperature with hydrogen chloride and 5.3 grams of nitrosyl chloride are dissolved therein. This mixture is then irradiated for 3 hours while stirring and cooling to about +15° C. Soon after the commencement of the irradiation, cyclohexanone oxime hydrochloride begins to separate, first as a viscous oil and then in colorless crystals. After 3 hours' irradiation the deposited oil is separated off and washed with a little water. Oil and washing water are united and the aqueous solution neutralized with caustic soda solution. The deposited crystals are filtered off by suction and washed with a little water. After drying, 5.6 grams of cyclohexanone oxime (=61 percent of the theoretical yield with reference to nitrosyl chloride used) of the melting point 89° C. are obtained. By extraction with ether of the aqueous mother liquor, further amounts of oxime are obtained.

Example 2

15 grams of nitrosyl chloride and 6 grams of hydrogen chloride are dissolved in 1 litre of cyclo-octane and irradiated for 3 hours as in Example 1. During the reaction, a viscous oil separates out and is run off from time to time. The collected oil is dissolved in a little water and carefully neutralized with caustic soda solution while stirring and cooling. The precipitated crystals are filtered off by suction and, after washing and drying, 27 grams of cyclo-octanone oxime of the melting point 42° C. are obtained. The yield corresponds to 84 percent of the theoretical yield, with reference to nitrosyl chloride used.

Example 3

The apparatus described in Example 1 is provided with a gas circulation pump which withdraws gas from the gas space and forces it back again through the stirrer in fine dispersion through the reaction liquid in circulation. 1 litre of cyclohexane is then charged into the vessel, rinsing with nitrogen is carried out for a short time, then with nitric oxide and the apparatus is placed under the nitric oxide pressure of a small gasometer. 6 grams of nitrosyl chloride are then dissolved in the cyclohexane and the whole irradiated for 3 hours with a mercury immersion lamp, the nitric oxide being pumped in circulation at the same time. The product is worked up as in Example 1 and 5.4 grams of cyclohexanone oxime (=52 percent of the theoretical yield) are obtained.

If hydrogen chloride sufficient to saturate the reaction mixture is added at the same time, 6.5 grams of cyclohexanone oxime (=63 percent of the theoretical yield) are obtained.

*Example 4*

The vessel described in Example 1 is charged with cyclopentane, the latter saturated at room temperature with hydrogen chloride and then 6.5 grams of nitrosyl chloride are added thereto. This mixture is irradiated for 3 hours while stirring and cooling to 15° C. The cyclopentanone oxime hydrochloride formed gradually settles out as a viscous oil. This is separated and dissolved in water. By neutralization of the aqueous solution with ammonia and extraction with ether, 6.5 grams of cyclopentanone oxime are obtained, corresponding to 65 percent of the theoretical yield with respect to the nitrosyl chloride used.

*Example 5*

1,000 grams of decahydronaphthalene are saturated with hydrogen chloride. 7.2 grams of nitrosyl chloride are added and the mixture irradiated for 3 hours in the way described in Example 1. A viscous oil is precipitated and is separated from time to time. The oil is dissolved in water. By neutralizing the solution with caustic soda solution, 11 grams of a mixture of isometric ketodecahydronaphthalene oximes are obtained, corresponding to a yield of about 60 percent of the theoretical yield with respect to the nitrosyl chloride used.

*Example 6*

The apparatus described in Example 1 is provided with a gas circulation pump which forces the gas withdrawn from the gas space through the stirrer in fine dispersion back through the reaction liquid in circulation. 1 litre of cyclo-octane is then charged into the vessel which is rinsed for a short time with nitrogen, then with nitric oxide and the apparatus is placed under the nitric oxide pressure of a small gasometer. 15 grams of nitrosyl chloride are then dissolved in the cyclo-octane and the mixture irradiated for 3 hours with a mercury immersion lamp, the nitric oxide being pumped in circulation at the same time. The product is worked up as in Example 1 and 33.5 grams of cyclo-octanone oxime hydrochloride are obtained, i.e. 83 percent of the theoretical yield with reference to nitrosyl chloride.

If at the same time there be added to the reaction mixture 6 grams of hydrogen chloride, the reaction product separates as a viscous oil which when worked up as in Example 2 gives a yield of 28 grams of cyclo-octanone oxime (=87 percent of the theoretical yield).

What we claim is:

1. In the process for the production of cycloaliphatic ketoximes by the reaction of cycloaliphatic hydrocarbons with nitrosyl chloride while irradiating with light the improvement which comprises carrying out said reaction with the addition of at least one member of the class consisting of hydrogen chloride and nitric oxide in an amount from about 1 gram per liter to the point where the cycloaliphatic hydrocarbons are saturated with the substance added.

2. An improved process for the production of cycloaliphatic ketoximes which comprises irradiating with actinic light at from about −50° C. up to about +40° C. a mixture containing an excess of a cycloaliphatic hydrocarbon of at least 5 ring carbon atoms, nitrosyl chloride and at least one member of the class consisting of hydrogen chloride and nitric oxide in an amount from about 1 gram per liter to the point where the cycloaliphatic hydrocarbons are saturated with the substance added separating the ketoxime hydrochlorides formed and neutralizing them.

3. An improved process for the production of cyclohexanone oxime which comprises irradiating with actinic light at about +15° C. a solution of nitrosyl chloride in excess cyclohexane saturated with hydrogen chloride, separating the ketoxime hydrochloride formed and neutralizing it by means of caustic soda solution.

4. An improved process for the production of cyclooctane oxime which comprises irradiating with actinic light at about +15° C. a solution of nitrosyl chloride and hydrogen chloride in excess cyclooctane in an amount of about 1 gram per liter to the point where cyclooctane is saturated with the hydrogen chloride, separating the ketoxime hydrochloride formed and neutralizing it by means of caustic soda solution.

5. An improved process for the production of cyclopentanone oxime which comprises irradiating with actinic light at about +15° C. a solution of nitrosyl chloride in excess cyclopentane saturated with hydrogen chloride, separating the ketoxime hydrochloride formed and neutralizing it by means of caustic soda solution.

6. An improved process for the production of a mixture of isomeric ketodecahydronaphthalenes which comprises irradiating with actinic light at about +15° C. a solution of nitrosyl chloride in excess dekahydronaphthalene saturated with hydrogen chloride, separating the ketoxime hydrochloride formed and neutralizing it by means of caustic soda solution.

7. An improved process for the production of cyclooctanone oxime which comprises pumping nitric oxide through a solution of nitrosyl chloride in excess cyclooctane the nitric oxide being pumped through in an amount of about 1 gram per liter to the point where the cyclooctane is saturated with the nitric oxide while irradiating with actinic light at about +15° C.

8. An improved process for the production of cyclooctanone oxime which comprises pumping nitric oxide through a solution of nitrosyl chloride and hydrogen chloride in excess cyclooctane the nitric oxide and the hydrogen chloride being used in combined amount of about 1 gram per liter to the point where the cyclooctane is saturated therewith while irradiating with actinic light at about +15° C.

References Cited in the file of this patent

UNITED STATES PATENTS 2,719,116    Brown             Sept. 27, 1955